Sept. 16, 1958 G. A. ARGABRITE 2,852,695
RADIATION DOSIMETER
Filed Dec. 12, 1955
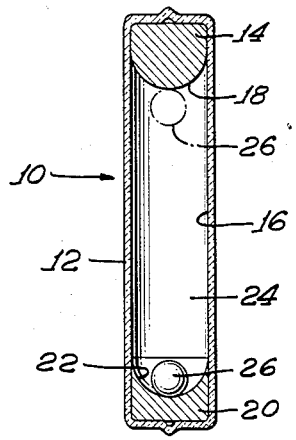
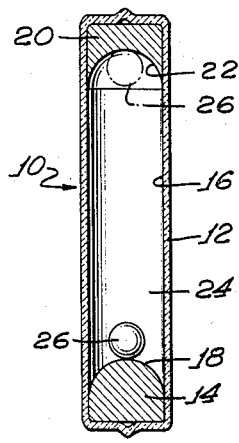
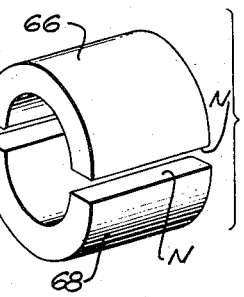
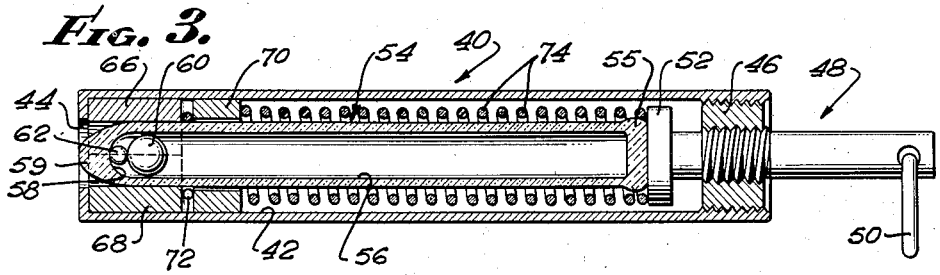
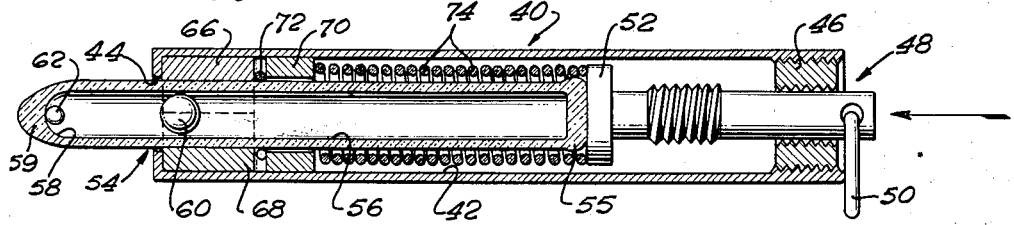
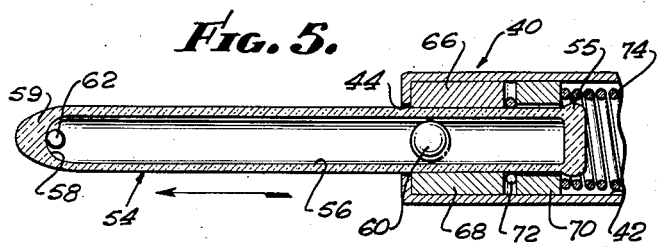
GEORGE A. ARGABRITE
INVENTOR.
BY
ATTORNEY.

United States Patent Office 2,852,695
Patented Sept. 16, 1958

2,852,695

RADIATION DOSIMETER

George A. Argabrite, Hollywood, Calif., assignor to Pacific Transducer Corp., Los Angeles, Calif., a corporation of California Application December 12, 1955, Serial No. 552,444

9 Claims. (Cl. 250—83.3)

The present invention is directed generally to means for measuring ionizing radiation and particularly to an improved device for visually indicating the amount of radiation to which the device has been subjected. It is small and portable, and intended to be carried by the user, as in his pocket.

The present dosimeter includes a body of dielectric material having an elongated chamber therein, preferably cylindrical. In this respect it is similar to the device disclosed and claimed in my United States Letters Patent No. 2,700,109. However, in the present invention there is provided only a single dielectric element movable within the chamber, and the limits of travel of the dielectric element longitudinally of the chamber are desirably formed by dissimilarly configured surfaces. In a preferred form the surface defining one limit of travel of the movable dielectric element is concave while the opposite limit of travel is convex. This affords a range of calibration for the instrument, as will be later understood.

The dosimeter is charged prior to use by shaking it, preferably vigorously and in a direction generally parallel to the axis of the chamber. A limited number of shakings is sufficient to fully charge the device. When fully charged, the movable dielectric element has an electrostatic charge with respect to the inner surfaces of the chamber, and with the axis of the chamber vertical, the dielectric element clings to the upper end of the chamber against the force of gravity. As ionizing radiation gradually reduces the charge, the dielectric element will at some point no longer cling to the upper end. By providing one convex end and one concave end, a range of calibration can be had, since the dielectric element will cling to the concave end against gravity after the instrument has been partially discharged so that the element will not cling to the convex end. For further refinement of calibration the instrument can be held, as by an inclinometer, with its longitudinal axis at an angle to the horizontal. As one end of the instrument is slowly raised, the dielectric element may at some point fall from the end to which it has previously clung. Observation of this angle yields a calibratically determinable degree of discharge of the instrument from its fully charged condition, and is hence a measure of the dosage or integrated amount of radiation received by the instrument since being fully charged.

In one form of the invention means are provided for preventing the dielectric element from moving about within the chamber during use. Each such movement, which may be caused for example by the user's body movement, tends to slightly recharge the instrument, and thereby to give an inaccurate reading. To prevent this, there is provided within the chamber a ferromagnetic keeper member such as a small sphere. Magnet means are provided outside the glass envelope and serve to maintain the keeper close to one end of the chamber within the envelope. The dielectric element is between the keeper and said end, so that the dielectric element is prevented from movement. The envelope may be slidably moved within the magnet means in order to permit the keeper to move away from said end and thus permit the instrument to be read when desired. In this form of the invention the entire envelope is desirably housed within a protective outer sheath or casing, made for example of aluminum, and means are included for propelling the envelope outwardly of the casing when a reading is to be taken.

Accordingly, among the objects the invention are to disclose a novel radiation dosimeter having an elongated chamber and a single dielectric element therein; to provide a device of this class having a wide range; and to disclose such a device including means preventing inadvertent recharge of the instrument during use. Other and additional objects will be understood as the invention is described in conjunction with the accompanying drawing in which:

Fig. 1 is a longitudinal sectional view of a dosimeter of the present invention, the inner dielectric element being shown in dotted outline in upper position and in solid line in lower position.

Fig. 2 is a view of the device of Fig. 1 turned end for end.

Fig. 3 is a sectional view of another form of the invention, the envelope being completely within the casing.

Fig. 4 is a view of the device of Fig. 3 with the actuating mechanism depressed and the envelope in partially projected position.

Fig. 5 is a fragmentary view of the device of Fig. 3, with the envelope in fully projected position.

Fig. 6 is a partially exploded perspective view of the magnetic means used in the device of Fig. 3.

In Figs. 1 and 2 there is shown a dosimeter in accordance with the present invention and indicated generally at 10. The device as shown in Fig. 2 is reversed end for end as compared with Fig. 1. The dosimeter 10 includes an envelope 12 made of glass or similar transparent dielectric material and sealed at each of its ends in conventional known manner. At the upper end of the device as seen in Fig. 1 there is an end piece 14 secured in suitable manner to the inner wall 16 which is preferably cylindrical in shape. The lower surface 18 of the end member 14 is desirably non-planar and in the specific form here shown it is convex. At the lower end of the device as seen in Fig. 1, there is shown another end member 20 fixed to the inner wall 16 of the envelope 12, and the upper surface 22 of the member 20 is concave in shape. Within the cylindrical chamber 24 of the envelope 12 there is a dielectric element 26 which is movable longitudinally of the chamber 24. The element 26 is preferably light in weight and may, for example, be made of polystyrene or similar material having relatively high surface and volume resistivity; it is preferably spherical in shape and smaller than the inner diameter of the envelope.

In use the device shown in Figs. 1 and 2 is charged by vigorously shaking it several times, preferably in a direction parallel to its longitudinal axis. The device is raised to a fully charged state with a limited number of vigorous shakings; under normal conditions from 30 to 40 shakings are sufficient. When fully charged the movable dielectric element 26 will cling to either end of the dosimeter 10 when that end is turned upwardly, as seen in dotted outline in Figs. 1 and 2; that is, the electrostatic attraction between the element 26 and the end member 14 or 20 is sufficient to overcome the force of gravity exerted on the element 26 itself.

The strength of the electrostatic charge creating the attractive force is gradually diminished by ionization of the interior of the chamber 24. Such ionization may result from incident radiation, particularly gamma radiation from an exterior source. As the attractive force is thus diminished there will arrive a time when the movable dielectric element 26 is no longer attracted to the convex surface 18 of the end member 14 with sufficient force to overcome the weight of the element 26, and the element therefore falls to the bottom of the dosimeter as shown in solid line in Fig. 1. I have found that after the dosimeter has been discharged by incident radiation sufficient to permit the dielectric element 26 to fall from the convex surface 18, there is nevertheless sufficient electrostatic attraction to retain the dielectric element 26 in contact with the concave surface 22 of the end member 20. Thus, at some degree of discharge of the instrument the dielectric element 26 will not be retained on the convex surface 18 against the force of gravity, but will be retained on the concave surface 22 of the end member 20 against the force of gravity. Consequently, by holding the instrument first with the convex surfaced end member 14 upwardly and observing whether or not the dielectric element 26 is retained thereon, the user learns whether or not the device is virtually fully charged. If the dielectric element 26 falls in such a situation, the user reverses the instrument end for end so that its orientation is as shown in Fig. 2. If the dielectric element 26 is then retained on the end member 20, the instrument indicates that it has been subjected to ionizing radiation between certain calibratically determinable limits. It will be understood that if the dielectric element 26 falls when the instrument is held in the orientation of Fig. 2, the indication is that a relatively large amount of radiation has been received by the instrument.

Accuracy of determination of the amount of radiation may be increased by measuring the inclination of the axis of the instrument 10 relative to the horizontal at the moment the dielectric element 26 falls downwardly from one or the other of the end members 14 and 20. In this way the present instrument, used in conjunction with a conventional inclinometer or other angle measuring device, will yield readings as to incident radiation dosage over a wide range of values.

In Figs. 3, 4, 5 and 6 there is shown another form of the present invention including means for preventing inadvertent partial recharge of the instrument during use. Since the instrument is given its original charge by shaking it and thus causing relative movement of the dielectric element within the envelope, it will be seen that the reading yielded by the instrument will be somewhat inaccurate if, after exposure to radiation, the instrument is again shaken or otherwise vigorously moved prior to taking a reading. In the alternative form about to be described means are provided for minimizing and virtually preventing relative movement between the dielectric element and the envelope.

In Fig. 3 there is indicated generally at 40 a hollow tubular casing which may be made of metal such as aluminum or the like. As will appear hereinafter, the material of the casing 40 should be virtually transparent to ionizing radiation and therefore lead, for example, would be unsuitable for such use unless extremely high dosages are to be measured. Within the casing 40 there is provided a generally cylindrical wall 42 forming a chamber and at one end there is an axial opening 44 of smaller diameter than the inner cylindrical wall 42. At the other end of the tubular member 40 there are means for supporting an actuating mechanism, including a threaded collar 46, the collar 46 being exteriorly and interiorly threaded and mating with an operating rod indicated generally at 48. The outer end of the rod 48 may have a pivotally attached handle such as ring member 50, and at the inner end of the rod 48 there is provided a preferably integrally formed enlarged head 52 of somewhat smaller diameter than the cylindrical surface 42 defining the chamber of the casing 40.

Means are provided within the chamber of casing 40 for slidably supporting therein an elongated hollow dielectric member indicated generally at 54. The outer diameter of the envelope 54 is such as to permit the envelope to move axially outwardly of the opening 44 formed in the end wall of the casing 40, as is particularly shown in Figs. 4 and 5. The envelope 54 is provided with an inner cylindrical wall 56 extending virtually throughout its length and terminating at one end in a concave surfaced portion 58. Slidable within the cylindrical chamber 56 there is a member 60, preferably spherical in shape and made of ferromagnetic material such as steel or the like. Desirably the member 60, which serves as a blocking element or keeper, is only slightly smaller than the interior of the tubular chamber 56 for reasons that will appear. Between the keeper 60 and the concave surfaced end 59 of the envelope 54 there is provided a dielectric element 62, preferably a sphere of polystyrene. The element 62 may be of any desired size so long as it is freely movable longitudinally of the envelope 54 within the tubular chamber 56 thereof. As will be seen, the keeper 60 insures that the dielectric element 62 does not pass by the keeper. The dielectric element 62 is thus retained in the end of the envelope 54 containing the concave inner surface 58.

Magnetic means are provided for retaining the ferromagnetic member 60 in a fixed position with respect to the exterior casing 40. In the present illustrative embodiment of the invention such means include a pair of semi-cylindrical magnetized members 66 and 68 best seen in the exploded perspective view of Fig. 6. The magnet members 66 and 68 have their north and south poles on their flat longitudinal edges, and they are assembled with like pole faces juxtaposed as indicated in Fig. 6. The inner diameter of the cylinder formed by so juxtaposing the magnet members 66 and 68 is substantially that of the outer diameter of the envelope 54, whereby the latter may freely slide axially through the magnets 66 and 68. The envelope 54 is additionally slidably supported within the protective casing 40 by a bushing 70 and between the bushing 70 and the magnets 66 and 68 there may be a snap ring 72, also slidable upon the outer diameter of the envelope 54. The magnets, snap ring and sleeve 70 are all resiliently retained in their positions shown by suitable spring means 74 helically extending around the envelope 54, and abutting the enlarged head 52 of the operating rod 48.

In order to charge the device of Fig. 3, the envelope 54 is moved to its outermost position relative to the protective casing 40. To accomplish this, the actuating rod 48 is rotated relative to the threaded bushing 46 so that the head 52 of the actuating rod moves inwardly. As soon as the actuating rod threads are disengaged from the interior threads of the bushing 46, the rod may be further pressed inwardly against the force of spring 74, thus moving the envelope 54 into the position seen in Fig. 4. The outer end of the envelope may then be manually grasped and pulled outwardly to the extreme position seen in Fig. 5, wherein the inner shoulder 55 of the envelope 54 is in abutting contact with the bushing 70. With the instrument in this position it will be noted that the ferromagnetic keeper 60 is retained in its same position relative to the protective casing 40 as before, so that a relatively long extent of the envelope 54 is available for movement of the dielectric element 60 therewithin. The instrument may now be charged by vigorously shaking it a number of times as previously described. The actuating rod 48 is threaded outwardly to its original position as seen in Fig. 3. After charging, the envelope 54 is manually pressed inwardly back to its position seen in Fig. 3, and it remains in that position during exposure to incident radiation. It is to be noted, in Fig. 3, that the dielectric element 62 is afforded virtually no possibility of movement within the envelope 54, by reason of the presence of keeper 60. Nevertheless, the radiation passing into or through envelope 54 serves to ionize the gas within the envelope, and thereby to cumulatively record the total dosage received. The degree to which the electrostatic charge between element 62 and envelope 54 is discharged is a function of such ionization.

Accordingly it will be seen that the present invention, in either of the exemplary forms herein shown and described, provides a dosimeter for measuring the cumulative dosage of incident radiation. It will be obvious that many variations of the specific size, shape and material of the several components of the device can be had. The end members 14 and 20 of the form of the invention shown in Figs. 1 and 2 may be of glass or of metal. The radii of curvature of the concave and convex surfaces of the end members may be varied within wide limits depending upon the range of incident radiation for which it is desired that the device be calibrated. One of such radii may be made very large if desired, whereby the respective surface facing inwardly is virtually planar. Variation of other physical parameters may be made to suit a particular application of the instrument, such as the pressure of air or other gas within the envelope, the length and diameter of the chamber within the envelope and similar factors. It is to be noted that in this connection the gas within the envelope need not be air. For example, if it is desired that the instrument be responsive to neutrons, the envelope may contain a quantity of a gas having an element such as boron whose atoms, upon being struck by neutrons, give off ionizing radiation; boron trifluoride is suitable as such gas.

The sensitivity of the instrument can be changed also by varying the thickness and type of glass used in the manufacture of the envelope. For example, if an instrument for measuring large amounts of radiation, such as several hundred Roentgens or higher is desired, the glass forming the envelope may be leaded so that the walls of the envelope act as partial shields against the incident radiation. Similarly, the range of the instrument may be varied as desired by selecting the size of the dielectric element within the envelope. In general the larger the dielectric element, the smaller the amount of incident radiation necessary to discharge the instrument to the level where the dielectric element will no longer cling to the upper end member.

Many modifications and changes in addition to those just suggested will occur to those skilled in the art. All such modifications and changes not substantially departing from the invention as hereinabove described are intended to be embraced within the scope of the appended claims.

I claim:

1. A radiation dosimeter comprising: a rigid tubular casing having an apertured end wall; an elongated hollow transparent envelope within the casing having a dielectric cylindrical inner surface; support means within the casing for slidably maintaining the envelope generally coaxial with the casing, one end portion of the envelope being projectible through the apertured end wall; a dielectric element within the envelope and movable longitudinally thereof, said end portion having an inner concave surface; and means within the envelope for limiting longitudinal movement of the dielectric element, said means presenting a substantially continuously convex surface to the element.

2. The invention as stated in claim 1 wherein said limiting means comprise a ferromagnetic member.

3. The invention as stated in claim 2 wherein said support means include magnet means in magnetic relation with said ferromagnetic member.

4. The invention as stated in claim 1 including selectively operable means carried by the end of the casing distant from the apertured end and movable relative thereto for abutting said envelope.

5. A radiation dosimeter comprising: a dielectric body having an elongated closed generally cylindrical chamber formed therein, an end wall defining the chamber being concave; a ferromagnetic keeper movable within the chamber and presenting a convex surface facing said concave end; a dielectric element within the chamber between said end and keeper, the keeper blocking movement of said element therebeyond; and magnet means surrounding said body and movable therealong for controllably positioning the keeper at a selected point longitudinally of the chamber.

6. The invention as stated in claim 5 including a hollow cylindrical casing surrounding said envelope and supporting said magnet means.

7. A radiation dosimeter comprising: an elongated hollow transparent envelope of dielectric material; longitudinally spaced means within the envelope presenting inwardly directed opposed surfaces, one surface being concave and the other substantially continuously convex; and a dielectric element within said envelope and movable longitudinally thereof.

8. The invention as stated in claim 7 wherein said means constitute end members fixed relative to said envelope.

9. The invention as stated in claim 7 wherein one of the spaced means is fixed relative to the envelope.

References Cited in the file of this patent

UNITED STATES PATENTS

| | | |
|---|---|---|
| 2,700,109 | Argabrite | Jan. 18, 1955 |
| 2,741,707 | Futterknecht | Apr. 10, 1956 |